United States Patent [19]

Langner

[11] Patent Number: 4,472,079
[45] Date of Patent: Sep. 18, 1984

[54] ARTICULATED PIPE DISCHARGE RAMP

[75] Inventor: Carl G. Langner, Spring, Tex.

[73] Assignee: Shell Oil Company, Houston, Tex.

[21] Appl. No.: 379,594

[22] Filed: May 19, 1982

[51] Int. Cl.$^3$ .............................................. F16L 1/04
[52] U.S. Cl. ..................................... 405/167; 403/56; 403/59
[58] Field of Search ....................... 405/158, 166, 167; 403/56, 59, 76, 78, 165

[56] References Cited

U.S. PATENT DOCUMENTS

| | | |
|---|---|---|
| Re. 28,922 | 8/1976 | Lloyd . |
| Re. 29,591 | 3/1978 | Lloyd . |
| 443,769 | 12/1890 | Hurford ............................ 403/56 X |
| 684,264 | 10/1901 | Kemmerer ......................... 403/56 X |
| 3,280,571 | 10/1966 | Hauber et al. ....................... 405/166 |
| 3,331,212 | 7/1967 | Cox et al. . |
| 3,517,519 | 6/1970 | Kolb et al. . |
| 3,538,712 | 11/1968 | Lochridge et al. . |
| 3,555,835 | 8/1968 | Smith . |
| 3,559,413 | 2/1968 | Silverman . |
| 3,641,779 | 2/1972 | Koop, Jr. et al. . |
| 3,670,511 | 6/1972 | Gibson et al. . |
| 3,685,305 | 8/1972 | Lloyd . |
| 3,704,596 | 12/1972 | Lloyd . |
| 3,736,760 | 6/1973 | Carstens et al. . |
| 3,739,590 | 6/1973 | Whitfield, Jr. . |
| 3,822,559 | 7/1974 | Matthews, Jr. et al. . |
| 3,911,689 | 10/1975 | Hogan . |
| 3,922,870 | 12/1975 | Recalde . |
| 3,990,259 | 11/1976 | Gunderson et al. . |
| 3,994,140 | 11/1976 | Gunderson . |
| 4,112,698 | 9/1978 | Lammert et al. ................... 405/167 |

FOREIGN PATENT DOCUMENTS 1404775 9/1975 United Kingdom ............... 405/167

OTHER PUBLICATIONS

"The Articulated Stinger: A New Tool for Laying Offshore Pipeline", by C. G. Langner, Offshore Technology Conference, Paper OTC-1073, May 1969.

Primary Examiner—David H. Corbin

[57] ABSTRACT

An articulated stinger attachable to a pipelaying vessel and constructed of a plurality of elongated multi-leg segments arranged in end-to-end relationship and interconnected by flexible joints. Each flexible joint is comprised of at least three components: two sockets, each in abutting ends of the multi-leg segments, and a socket-filling member. The stinger may be arranged inclined to the horizontal as in conventional pipelaying practice, or vertically for J-method pipelaying. A resilient element may be carried within the sockets to yieldably restrain relative movement between the socket and the socket-filling member.

5 Claims, 4 Drawing Figures

FLEXIBLE STINGER FOR VERTICAL PIPELAY FROM CONVERTED DEEPWATER DRILLING SHIP

FIG.1 FLEXIBLE STINGER FOR VERTICAL PIPELAY FROM CONVERTED DEEPWATER DRILLING SHIP

ARTICULATED STINGER -
HITCH SEGMENT GEOMETRY

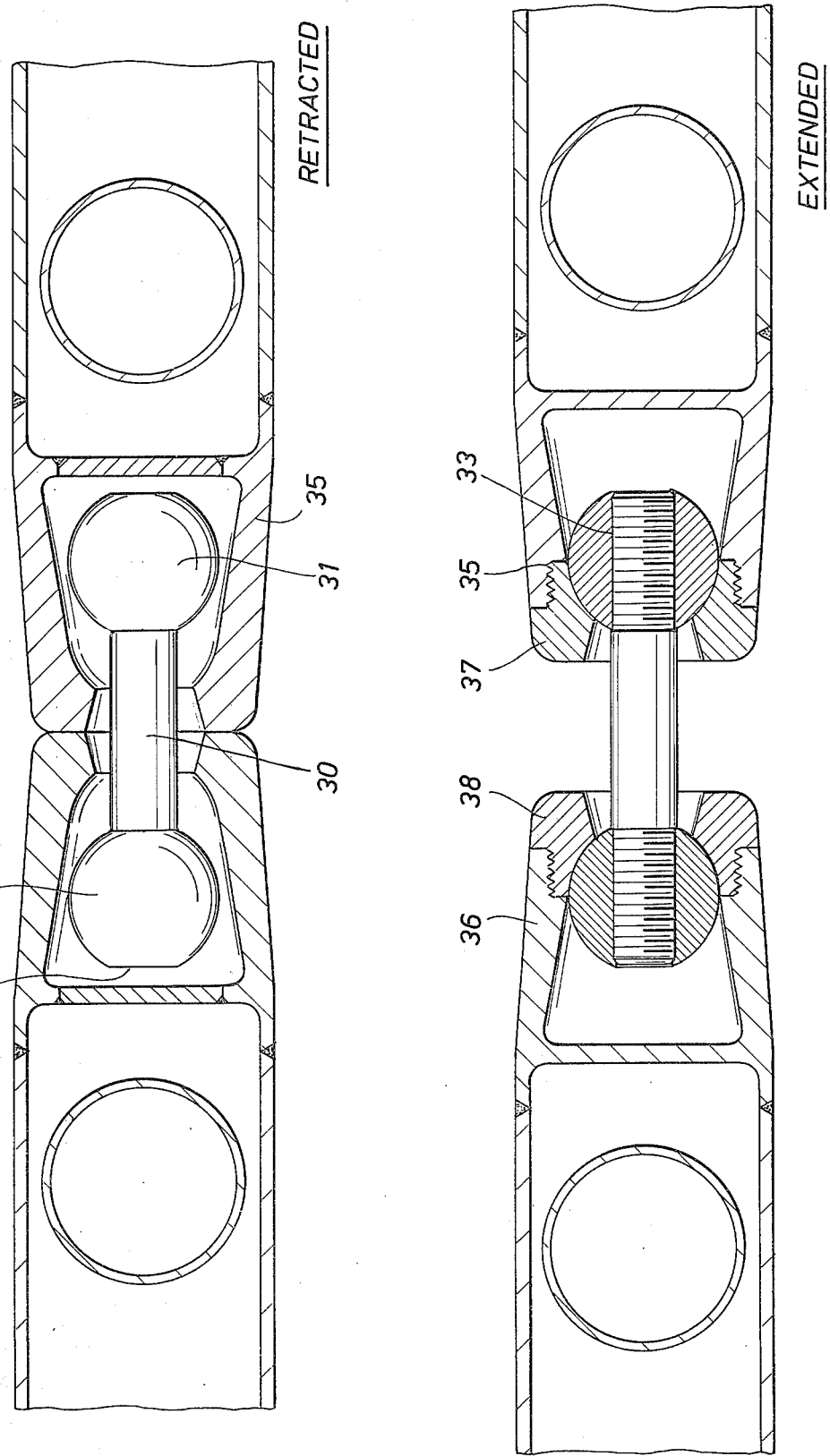

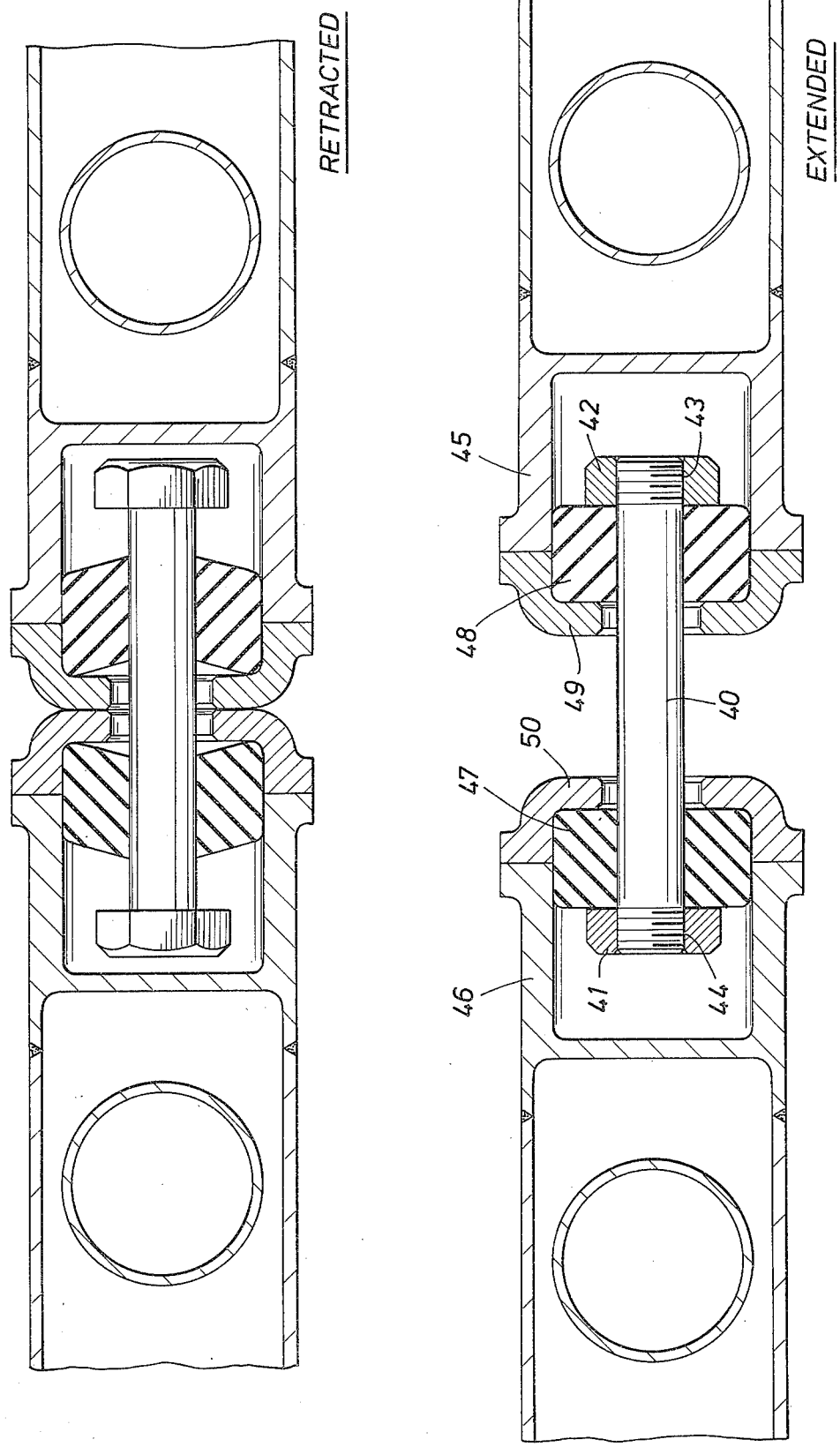
FIG. 4 BOLT CONCEPT WITH RUBBER DAMPERS

ARTICULATED PIPE DISCHARGE RAMP

BACKGROUND OF THE INVENTION

The present invention relates in particular to an articulated stinger for a pipelaying vessel and more particularly to an articulated stinger having flexible joints, which may be used conventionally for S-method pipelaying or vertically for J-method pipelaying.

Along with the increasing development of oil and gas wells offshore, demand for pipelaying apparatus to connect underwater facilities or to bring oil and gas to shore has increased sharply. Special purpose pipelay barges or other floating vessels are employed to lay underwater pipelines along the ocean floor. A typical pipelaying operation involves assembling the pipeline by adding one section of pipe at a time on the barge and then moving the barge ahead as the assembled pipeline is paid out and laid onto the ocean floor. Alternatively, the pipeline may be preassembled and wound onto a rotatable reel which has been mounted on the barge or ship. The pipeline then is spooled off the reel and laid onto the sea floor after the barge or ship arrives at the proper field location.

Any pipeline is capable of withstanding some bending but such bending must stay within predetermined limits to avoid permanently deforming (buckling) or fatiguing (fracturing) the pipeline. As the pipeline is laid from a conventional pipelay barge, the pipeline exits the barge and follows a more or less "S" shaped configuration from the barge deck to the ocean floor. In relatively shallow waters, the vertical descent of the unsupported pipeline, being small, results in a large radius of curvature of the pipeline as it comes off the barge, and the pipe remains safe from bending damage. However, as the water depth increases, the length of unsupported pipeline increases, causing the pipeline to sag under its own weight. Thus, the radius of curvature of the pipeline as it leaves the barge becomes smaller and the bending moments imposed on the pipeline may well exceed the allowable limits and result in permanent deformation of the pipeline.

For deeper water pipelaying operations, a pipe discharge ramp, or so-called "stinger", is used to control the bending of the pipe in the overbend portion of the suspended pipe span. This "stinger" generally is a long, slender, rigid structure which extends outward and curves downward from the stern end of the pipelay barge, and contains rollers for supporting and paying out the pipe as the barge moves forward. The stinger often is used in conjunction with flotation means to force the pipeline to assume a curvature whose minimum radius is great enough to avoid undue bending. Reference may be had to the following patents and literature exemplifying the state of the art: an article by C. G. Langner entitled "The Articulated Stinger: A New Tool for Laying Offshore Pipelines", Offshore Technology Conference, Paper OTC-1073, May, 1969; and U.S. Pat. Nos. 3,331,212; 3,517,519; 3,555,835; 3,538,712; 3,559,413; 3,641,779; 3,670,511; 3,685,305; 3,704,596; 3,736,760; 3,739,590; 3,822,559; 3,911,689; 3,922,870; 3,990,259; 3,994,140; 4,112,698; RE 28,922; and RE 29,591.

However, the current state of the art does not deal satisfactorily with several problems. Thus, as the pipeline leaves the barge and acts against the ramp, it exerts more than just a vertical component of force against the stinger. If the barge deviates slightly from its course or if lateral currents are present which act against the pipeline as it is being laid, the pipeline will attempt to move laterally off the stinger, but since it is held in place, it will exert a sideways or lateral force against the remote end of the stinger. This lateral force is translated into a sideways bending moment at the connection of the stinger to the barge. Even further, the pitching and rolling motions of the vessel may introduce additional bending and torsional moments in the stinger. Such forces, acting on a substantially rigid structure, may reach such a magnitude that would significantly damage the stinger, thereby causing a cessation in the pipelaying operation and down time to repair the stinger or even replace it. And, in the event of using a vertical stinger, which is a particular subject of the present invention, problems with vessel roll are even greater.

As pipelaying progresses into even deeper waters, the slope of the suspended pipeline will become steeper and steeper, and in very deep waters the suspended pipeline will of necessity approach the pipelay vessel in a nearly vertical orientation. Conventional S-method pipelaying in such depths will require a stinger that is extremely long and vulnerable to rough sea conditions. A more satisfactory method of laying pipelines in very deep waters is the J-method, wherein the pipeline is assembled on the barge or ship in a vertical or near-vertical orientation, thereby eliminating the pipe overbend associated with the S-method. Pipe assembly utilizing either a vertical derrick or an adjustably inclined ramp or tower, would require only a relatively small vertical stinger which would control bending of the pipe due to horizontal tension, ocean currents, and pitch and roll motions of the vessel.

Hence, there exists a need for an articulated stinger which not only will accommodate the operating conditions encountered during conventional pipelaying operations without causing damage to the stinger, but also in less conventional pipelaying operations as more particularly described hereinafter.

SUMMARY OF THE INVENTION

In answer to the above needs of the art, the present invention provides an articulated stinger or pipe discharge ramp attachable to a pipelaying vessel for guiding a pipe being laid from said vessel, said discharge ramp including a plurality of elongated interconnected ramp segments arranged in end-to-end relationship; and flexible joint means interconnecting at least a pair of said segments to permit the segments to flex in any direction within a preselected angle. The flexible joint means includes at least two sockets, with each socket being in an abutting end of said pair of segments and two connected socket-filling members.

The present invention also provides a method for laying pipeline from a pipelaying vessel which includes attaching a flexible pipe discharge ramp in a vertically hanging position to the pipelaying vessel; deploying pipeline through the pipe discharge ramp; and allowing the pipe discharge ramp to flex in any direction within a preselected angle responsive to pressures exerted on the deployed pipeline and/or the lay vessel. The pipelay vessel may be a drilling ship, and the pipe discharge ramp may be disposed beneath the moon pool of such ship. The pipelay vessel hull may have conical indentations, while the upper ends of the pipe discharge ramp may have docking cones, and the pipe discharge ramp may be attached to the pipelay vessel by mating the docking cones with the conical indentations. Alternatively, the pipe discharge ramp may be attached to the drilling ship by means of specially reinforced connection points inside or along the lower rim of the moon pool. The ramp or stinger may be deployed either by lowering it through the moon pool, if space limitations so permit, or by keel hauling and lifting it into place from outside the vessel. Release and removal of the ramp or stinger would be by a reverse procedure.

These and other purposes of the present invention will become more apparent hereinafter upon further reading of the specification.

BRIEF DESCRIPTION OF THE DRAWINGS

FIG. 3 pertains to a flexible joint for an articulated stinger employing a dumbbell configuration.

FIG. 4 discloses a flexible joint employing a bolt concept with rubber dampers.

DESCRIPTION OF THE PREFERRED EMBODIMENTS

Figure 1:
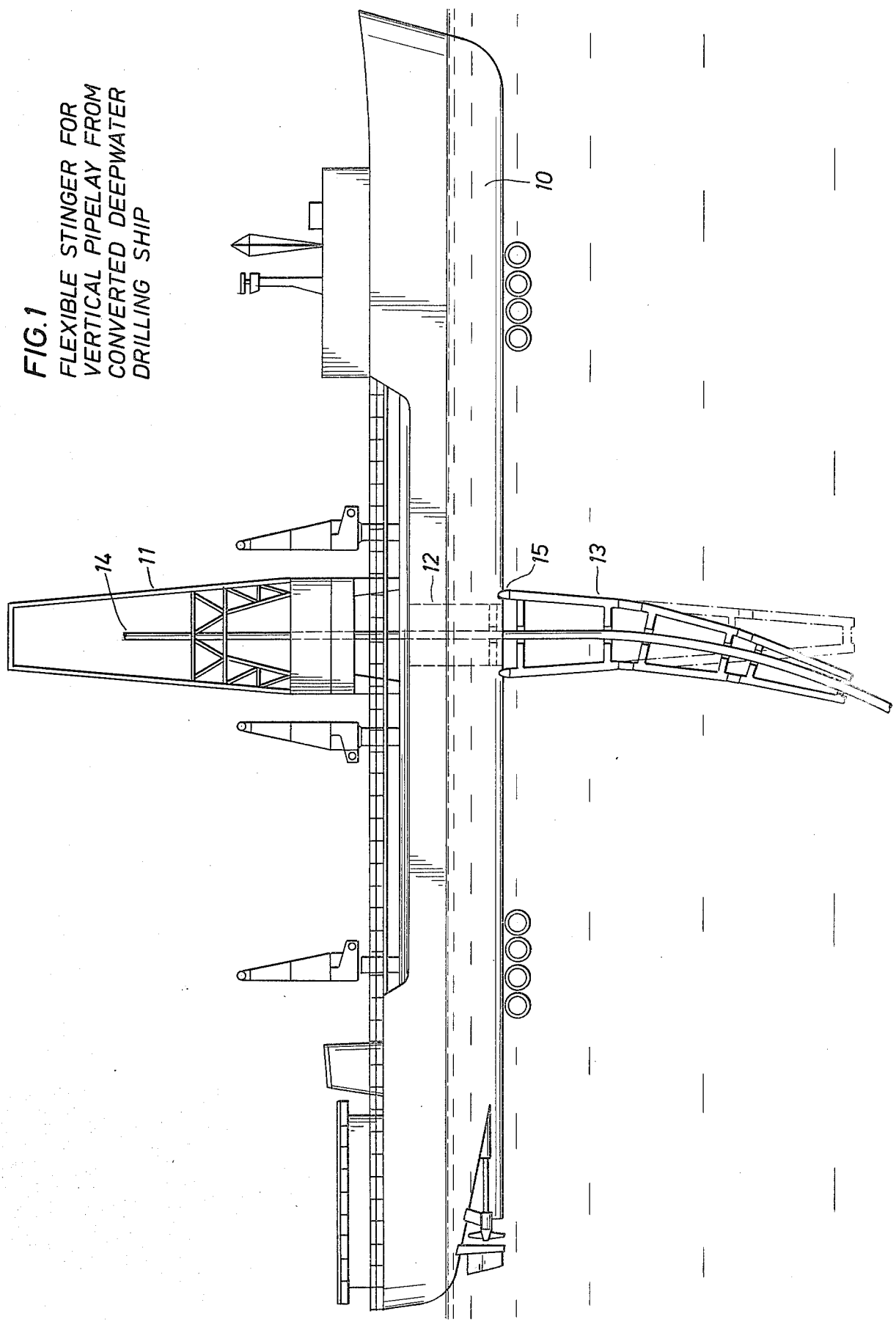
FIG. 1 pertains to a flexible stinger for vertical pipelay from a converted deepwater drilling ship.

In accordance with the present invention it is feasible under some circumstances to convert an existing deepwater drilling ship, semisubmersible drilling rig, or other vessel to lay pipelines. Using the existing derrick, moon pool, etc., such a vessel or rig typically may lay pipe in the range of 1000 to 10,000 feet, where pipelaying by conventional methods (laybarge, reel barge, etc.) becomes increasingly difficult and expensive.

A necessary part of the conversion of an existing drilling vessel, semisubmersible drilling rig, or other vessel to pipelaying is the use of a vertical stinger, which is attached to the bottom hull of the drilling ship or other vessel, or beneath or off the side of the semisubmersible rig for the purpose of guiding and protecting the pipeline being deployed to the ocean floor.

In accordance with the invention, a multi-segment flexible stinger for vertical pipelay is provided. Typical structural configurations are disclosed hereinafter which may be two-segment, three-segment, etc. configurations. Two flex joint designs are likewise disclosed, although other modifications and variations will occur to those skilled in the art without departure from the scope of the present invention. A significant feature of the stinger is its flexibility which allows the lower stinger segment to rotate 10 to 15 degrees from vertical in order to accommodate pipe deflections up to 20 degrees. The pipeline may be deflected from the vertical axis by (1) horizontal tension applied to the pipeline to control sag bend strains, (2) ocean currents, (3) pitch and roll motions of the drilling ship or semisubmersible rig or other pipelay vessel. Both the horizontal tension and the resultant current drag forces may act in directions skew to the vessel heading, so that the pipeline in general will approach the vessel obliquely to the vessel axis. Thus, the main function of the stinger is to control the curvatures of the upper end of the pipe span under such adverse conditions. Without a stinger, the pipeline could fail by buckling due to excessive bending in one direction or by metal fatigue due to cyclic bending.

Minor modifications of the drill ship are necessary to adapt to the vertical stinger. Three or more concial indentations in the vessel hull would mate with cones at the upper end of the three or more longitudinal members of the stinger. Connection and release of the stinger is via wirelines threaded through openings in each of these docking cones and attached to the top end of the stinger. Hydraulically actuated lugs or cams (not shown) at each docking cone would secure the stinger in place during pipelaying operations. Other vessels, including semisubmersible drilling rigs, may also require some minor modifications to adapt such stinger.

The articulated flex joints useful in vertical stingers in accordance with the present invention can also be used to control the vertical and lateral motions of a conventional articulated stinger. Either three or four such flex joints are used between each pair of rigid stinger segments, depending on the number of longitudinal members comprising each segment. Existing stingers are completely free to rotate vertically about a pair of horizontal hinge pins, except for bumper stops which control the downward curvature of the stinger. The additional control of stinger motion implied in the use of the flex joints of the present invention, as well as the improved strength of this type of joint, are beneficial both to the lifetime of the stinger and to the contact loads applied to pipeline while laying in rough seas.

Accordingly, having above generally described the present invention, the invention will now be more particularly described in accordance with the drawings.

FIG. 1 discloses a conventional deepwater drilling ship 10 having an existing derrick 11, moon pool 12 and a flexible, vertical stinger 13 attached thereto. Pipe 14 is put together into a pipeline in the derrick 11 and passed through moon pool 12 and flexible stinger 13. The stinger is attached to vessel 10 by docking cones 15 which mate with the corresponding indentations in the hull of the vessel. Wirelines attach to the flexible stinger 13 and pass through holes (not shown) in docking cones 15 and into the vessel. Connection and release of the stinger is via such wirelines and hydraulically actuated lugs or cams (also not shown) at each cone which secure the stinger in place during pipelaying operations. Appropriate modifications can also be made to a semisubmersible drilling rig or other vessel to facilitate use therewith of the herein disclosed system.

Figure 2:
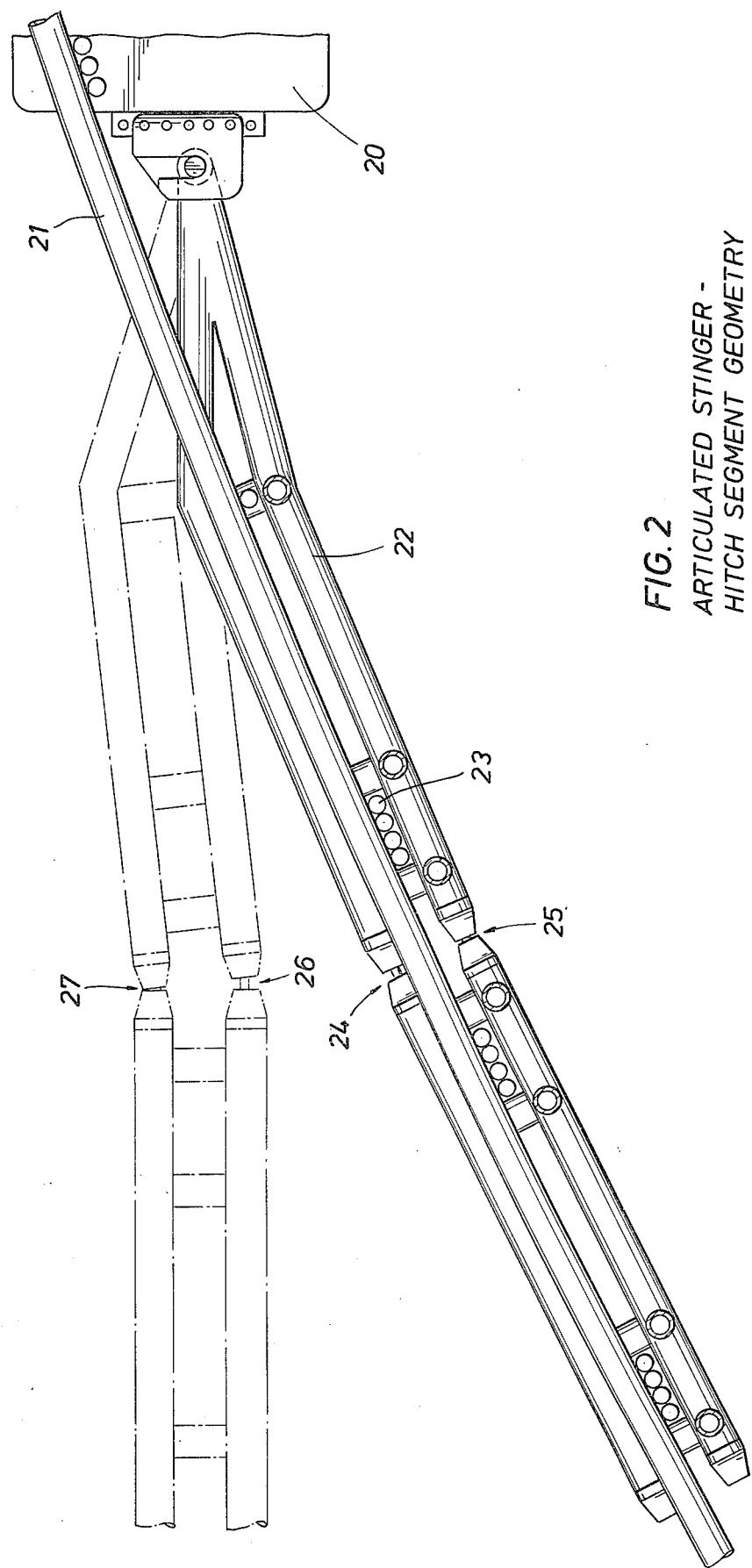
FIG. 2 discloses an articulated stinger hitch segment attached to the back end of a conventional pipelay vessel.

In FIG. 2 the articulated stinger of the present invention is shown connected to the rear end of a vessel 20 in the manner of a conventional stinger. A pipe 21 passes out of the rear of the vessel and is cradled by stinger 22. The pipe passes over rollers 23 of the stinger which is able to substantially flex as shown particularly at joints 24 and 25. When the stinger is in a raised mode as shown in phantom thereabove, joint 26 is open and joint 27 is closed. Such flexibility improves the lifetime of a given stinger and reduces the contact loads applied to the pipe while laying in rough seas.

In FIG. 3 there is shown one embodiment of a flexible joint for the stinger. A dumbbell type of connection includes a shaft 30 and two spheres 31 and 32 at either end thereof. The spheres may be attached to the shaft by threads 33 or in any other manner known to the art. The spheres have a flattened head 34 which allows them to abut within the outer case 35 without doing damage thereto. The outer case has internally machined tapers and a spherical socket which contains the spheres 31 and 32. The upper part of FIG. 3 shows the flexible joint in a closed position with the outer case 35 of one side abutting that of the other side. The lower part of FIG. 3 shows the flexible joint in an opened position with the spheres 31 and 32 abuttng the ends of the spherical sockets 35 and 36. The spherical sockets 35 and 36 may be manufactured in one piece, as in the upper part of FIG. 3, or in two pieces by attaching a second piece 37 and 38 to the first piece 35 and 36, thereby enclosing the spheres 31 and 32.

Another embodiment of the flexible joints of the present invention is shown in FIG. 4. In this embodiment, a bolt is employed including a shaft 40 and nuts 41 and 42 at either end of the bolt which are threaded thereonto by threads 43 and 44. Rubber dampers within sockets 45 and 46 cushion or provide resilient seating for nuts 41 and 42 within the sockets. As with the embodiment of FIG. 3, the closed joint position is shown in the upper figure and the open joint is shown in the lower figure. The rubber dampers 47 and 48 are enclosed within the sockets 45 and 46 by attaching thereto end closures 49 and 50.

It will be apparent to those skilled in the art that modifications of the present invention disclosed in this application may be employed without departing from the spirit of the invention or the scope of the appended claims.

What is claimed is:

1. An articulated pipe discharge ramp attachable to a pipe laying vessel for guiding a pipe being laid from said vessel, said pipe discharge ramp comprising:
   a plurality of elongated interconnected ramp segments arranged in end-to-end relationship; and
   flexible joint means interconnecting at least a pair of said segments to permit said segments to flex in any direction within a preselected angle which is less than about 20 degrees, the apex of the angle being where the pipe discharge ramp is attached to the vessel and the radius of the angle extending to the furthermost end of the ramp, said flexible joint means including at least two sockets, with each socket being in an abutting end of said pair of segments, and two connected socket-filling members.

2. The apparatus of claim 1 wherein said connected socket-filling members are in the form of a double-headed bolt.

3. The apparatus of claim 2 wherein cushioning means is provided between the bolt heads and the sockets.

4. The apparatus of claim 1 wherein the ramp is attachable to the pipelay vessel in a vertically hanging position.

5. The apparatus of claim 4 wherein the pipelay vessel is a drilling ship having a moon pool, and the pipe discharge ramp is disposed beneath the moon pool.

* * * * *